United States Patent
Bakshi

(10) Patent No.: US 11,249,890 B2
(45) Date of Patent: Feb. 15, 2022

(54) SOFTWARE DEFECT CREATION

(71) Applicant: Webomates LLC, Stamford, CT (US)

(72) Inventor: Aseem Bakshi, Darien, CT (US)

(73) Assignee: WEBOMATES LLC, Stamford, CT (US)

(*) Notice: Subject to any disclaimer, the term of this patent is extended or adjusted under 35 U.S.C. 154(b) by 0 days.

(21) Appl. No.: 16/910,653

(22) Filed: Jun. 24, 2020

(65) Prior Publication Data
US 2021/0406157 A1 Dec. 30, 2021

(51) Int. Cl.
*G06F 11/36* (2006.01)
*G06N 20/00* (2019.01)
*G06F 11/34* (2006.01)

(52) U.S. Cl.
CPC ...... *G06F 11/3688* (2013.01); *G06F 11/3476* (2013.01); *G06F 11/3636* (2013.01); *G06F 11/3684* (2013.01); *G06F 11/3692* (2013.01); *G06N 20/00* (2019.01)

(58) Field of Classification Search
CPC .............................. G06F 11/3688; G06N 20/00
USPC .................................................. 717/124–135
See application file for complete search history.

(56) References Cited

U.S. PATENT DOCUMENTS

| | | | | |
|---|---|---|---|---|
| 5,951,697 | A * | 9/1999 | O'Donnell | G06F 11/2242 714/37 |
| 6,237,138 | B1 * | 5/2001 | Hameluck | G06F 11/34 717/128 |
| 8,001,468 | B2 | 8/2011 | Khaladkar et al. | |
| 9,348,727 | B1 * | 5/2016 | Cai | G06F 3/04842 |
| 2014/0325486 | A1 | 10/2014 | Zhang et al. | |
| 2015/0363300 | A1 | 12/2015 | Luan et al. | |
| 2017/0195561 | A1 * | 7/2017 | Hegelich | G06K 9/00744 |
| 2020/0050534 | A1 * | 2/2020 | Sze | G06F 11/2635 |

OTHER PUBLICATIONS

Narwaria, Manish, and Weisi Lin. "SVD-based quality metric for image and video using machine learning." IEEE Transactions on Systems, Man, and Cybernetics, Part B (Cybernetics) 42.2 (2011): pp. 347-364. (Year: 2011).*

(Continued)

*Primary Examiner* — Satish Rampuria
(74) *Attorney, Agent, or Firm* — Shumaker, Loop & Kendrick, LLP

(57) ABSTRACT

A system and a method for creating a defect identified during a test case run. A bug is detected during an execution of the test case on a functionality of a software. The bug is detected by comparing an actual output of the functionality with an expected output of the functionality. A setup, indicating actions performed on the software, associated with the bug is identified. Further, a video snippet is generated from a video recording of the test case being executed. The video snippet depicts an execution of the bug caused due to the setup. Furthermore, the setup is analysed using AI and ML techniques to determine an exact location of the bug. Further, a screen, from the video snippet, indicating the exact location of the bug is automatically highlighted. In addition, a defect comprising a recommendation to resolve the bug is created.

13 Claims, 3 Drawing Sheets

(56) References Cited

OTHER PUBLICATIONS

Cui, Yonggang. Using deep machine learning to conduct object-based identification and motion detection on safeguards video surveillance. No. BNL-207942-2018-COPA. Brookhaven National Lab.(BNL), Upton, NY (United States), 2018.pp. 1-10 (Year: 2018).*

De Chaumont, Fabrice, et al. "Real-time analysis of the behaviour of groups of mice via a depth-sensing camera and machine learning." Nature biomedical engineering 3.11 (2019): pp. 930-942. (Year: 2019).*

Xie, Xihao, et al. "Dretom: Developer recommendation based on topic models for bug resolution." Proceedings of the 8th international conference on predictive models in software engineering. 2012.pp.19-28 (Year: 2012).*

Xia, Xin, et al. "Dual analysis for recommending developers to resolve bugs." Journal of Software: Evolution and Process 27.3 (2015): pp. 195-220. (Year: 2015).*

Baloch, Muhammad Zubair, et al. "Software Developer Recommendation in Terms of Reducing Bug Tossing Length." International Conference on Security, Privacy and Anonymity in Computation, Communication and Storage. Springer, Cham, 2020.pp. 369-407 (Year: 2020).*

\* cited by examiner

SOFTWARE DEFECT CREATION

TECHNICAL FIELD

The present subject matter described herein, in general, relates to a system and a method for creating a defect identified during a test case run of a software.

BACKGROUND

Generally, every software is launched after performing a series of testing on each functionality of the software. In order to perform the testing, a software developer may write a test script to validate each functionality of the software. Further, the test scripts may be executed on the software by a team to identify one or more defects in the software. Conventionally, the team may utilize testing techniques comprising unit testing, integration testing, system testing, sanity testing, smoke testing, interface testing, regression testing, beta/acceptance testing and the like. Further to performing the testing, the team needs to critically analyze an outcome of each test script to identify one or more defects or bugs in the software. The bugs may be identified by comparing an actual output with an expected output of the software.

Currently, the bugs are identified by the team upon analysis of a) an execution of the test script and b) a working of each functionality of the software. Thus, the analysis solely relies on manual skills and acumen which may be susceptible to errors. In addition, the analysis may also be impacted because of a change in an environment, a modification of the test scripts, a modification in a functionality of the software and the like.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for creating a defect identified during a test case run. This summary is not intended to identify essential features of the claimed subject matter nor is it intended for use in determining or limiting the scope of the claimed subject matter.

In one implementation, a method for creating a defect identified during a test case run is disclosed. Initially, a test case may be executed on a functionality of a software. Further, a bug may be detected during the execution of the test case. In one aspect, the bug may be detected by comparing an actual output of the functionality with an expected output of the functionality. Subsequently, a setup associated with the bug may be identified. In one embodiment, the setup may indicate actions performed on the software. Furthermore, a video snippet may be generated from a video recording of the test case being executed. In one aspect, the video snippet may depict an execution of the bug caused due to the setup. Subsequent to generating the video snippet, an exact location of the bug, whether the change is a feature modification or a defect or a dynamically updated content may be determined upon analysis of the setup using predefined rules and Artificial Intelligence and Machine Learning techniques. Further, a screen from the video snippet pertaining to the exact location of the bug may be automatically highlighted. In addition, a defect corresponding to the bug may be created. In one aspect, the defect may also comprise a recommendation to resolve the bug present in the highlighted screen of the video snippet. In one aspect, the aforementioned method for creating a defect identified during a test case run may be performed by a processor using programmed instructions stored in a memory.

In another implementation, a non-transitory computer readable medium embodying a program executable in a computing device for creating a defect identified during a test case run is disclosed. The program may comprise a program code for executing a test case on a functionality of a software. The program may comprise a program code for detecting a bug during the execution of the test case. In one aspect, the bug may be detected by comparing an actual output of the functionality with an expected output of the functionality. Subsequently, the program may comprise a program code for identifying a setup associated with the bug. In one aspect, the setup may indicate actions performed on the software. Further, the program may comprise a program code for generating a video snippet from a video recording of the test case being executed. In one aspect, the video snippet depicts an execution of the bug caused due to the setup. Furthermore, the program may comprise a program code for determining an exact location of the bug, whether the change is a feature modification or defect or dynamically updated content may be determined upon analysis of the setup using predefined rules and Artificial Intelligence and Machine Learning techniques. Subsequently, the program may comprise a program code for automatically highlighting a screen from the video snippet pertaining to the exact location of the bug. Finally, the program may comprise a program code for creating a defect corresponding to the bug. The defect may comprise a recommendation to resolve the bug present in the highlighted screen of the video snippet.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures, however, the invention is not limited to the specific method and system for creating a defect identified during a test case run disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "executing", "detecting," "identifying," "generating," "highlighting," "creating," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

The present subject matter discloses a system and a method for creating a defect identified during a test case run. It may be noted that the testing is performed in areas including, but not limited to, a User Interface (UI), an Application Programming Interface (API), load, visual and alike. It must be noted that multiple functionalities of the software are tested using one or more different types of testing techniques. For example, the UI of the software is tested using at least one of an automation testing, a manual testing, and a crowdsource testing. It may be noted that the software is tested to identify a defect associated with the functionality of the software. Thus, it is imperative to accurately identify and create the defect present in the functionality.

In order to create the defect, the system may detect a bug associated to the functionality. Further, a setup indicating actions performed by the software may be recorded in a video snippet. In one example, the system may merge multiple video snippets to create a merged video. The merged video may represent different parts of the functionality having the bug. Furthermore, the system may automatically highlight the bug present in the video snippet for creating the defect. The defect may also comprise a recommendation to resolve the bug. While aspects of described system and method creating a defect identified during a test case run may be implemented in any number of different computing systems, environments, and/or configurations, the embodiments are described in the context of the following exemplary system.

Figure 1:
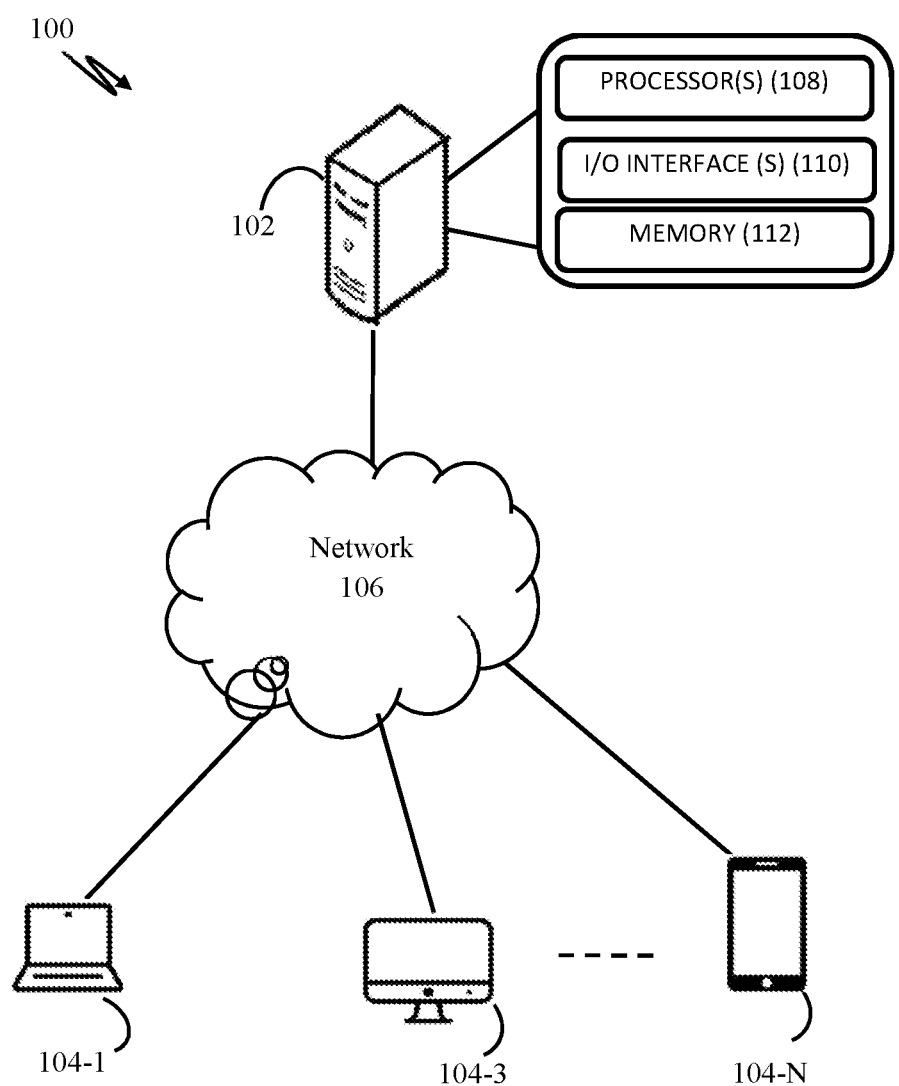
FIG. 1 illustrates a network implementation of a system for creating a defect identified during a test case run, in accordance with an embodiment of the present subject matter.

Referring now to FIG. 1, a network implementation 100 of a system 102 for creating a defect identified during a test case run is disclosed. Initially, the system 102 executes a test case on a functionality of a software. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives an actual result of the execution of the test case from one or more user devices 104. Further, the system may also 102 receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or nonvolatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for creating a defect identified during a test case run. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for creating a defect identified during a test case run. The system 102 may create the defect in real time without any human intervention. The defect may be created automatically upon completion of an execution of the test case on the software. In order to create the defect, initially, the system 102 executes the test case on a functionality of the software. It may be noted that each software may comprise multiple functionalities. The test case may comprise a set of conditions or variables to examine the software under test. The test case comprises at least one of an automation test case, a manual test case, and a crowdsource test case. The execution of the test case results in at least one of a true failure, a false failure, a true pass, or a false pass. The true failure may indicate a bug in the software. The true failure is the defect identified by the system 102 and a reviewer. On the other hand, the false failure may be the defect identified by the system 102 and not by the reviewer. Also, the false failure may indicate a modification in the test case or a failure in the execution of the test case. The true pass is not the defect and indicates that there are no issues in the software. On the contrary, the false pass is the defect identified by the reviewer and not by the system 102.

Further to the execution of the test case, the system 102 receives an actual output of the functionality. Furthermore, the system 102 compares the actual output with an expected output of the functionality. It may be noted that the expected output of the functionality may be provided by the system 102. Subsequently, the system 102 may detect the bug during the execution of the test case based on the comparison of the actual output and the expected output of the functionality. In one embodiment, the bug may be detected when the test case results in the true failure.

Further to detecting the bug, the system 102 identifies a setup associated with the bug. It may be noted that the setup indicates actions performed on the software. Typically, the actions may include, but not limited to, a click on a button, a click on a banner, a mouse hover, a pointer, an input of information, submission of information, and a combination of at least the click on the button, the mouse hover, and the submission of information. The actions may represent an output of the functionality present in the software. In one embodiment, the actions may correspond to an instruction provided by the user while performing the manual testing or the crowdsource testing. In other embodiment, the actions may correspond to the instruction provided by an automation test script during the automation testing. It may be noted that the automation test case may also be executed using machine learning models. Example of the machine learning models may include, but not limited to, random forest and decision trees.

The system 102 may identify the setup upon analysis of at least one of software trace logs associated to the functionality of the software, automation logs, a browser HAR file, a latency variance, a comparison of historical logs with current logs, a screenshot comparison, and release notes for new features of the software. It may be noted that the screenshot comparison helps in identifying a deviation in the actual output from the expected output. The release notes for the new features may comprise a set of actions to be performed by the software post execution of the new features of the functionality. It may also be noted that the software trace logs may facilitate in locating a code snippet corresponding to the functionality of the software. The code snippet may comprise one or more lines of codes.

Subsequent to identifying the setup, the system 102 may generate a video snippet from a video recording of the test case being executed. It may be noted that the video snippet may depict an execution of the bug caused due to the setup. In one implementation, the system 102 may identify a mark in point and a mark out point from the video recording in order to generate the video snippet. The mark in point may be identified based on a first validation point located before an occurrence of the bug. The mark out point may be identified based on a second validation point located after the occurrence of the bug. In other implementation, the mark in point and mark out point may be identified upon analysing the software trace logs. The software trace logs may be analysed using the Artificial Intelligence (AI) techniques.

The system may use predefined rules and the AI techniques to correlate steps of the setup and the validation points to determine the mark in and mark out points of the setup prior to the defect occurring. It may be noted that a metadata timeline model may be created for each input using Natural Language Processing (NLP) techniques on a combination of test case steps, validation steps, video and software trace logs. The NLP techniques may perform at least a text analysis, an image analysis, AWS Rekognition, and a deep image AI analysis on the video snippet to create the metadata timeline.

In order to correlate the test case steps and validation points and the execution video a timeline model may be used. The test cases and steps may be run through an NLP to identify the intended setup steps. In addition, the video snippet may run for an object identification through the machine learning models such as AWS Rekognition and Convolutional Neural Networks (CNN) to compare image patches from the screen. The machine learning models may compare expected steps and the validation points against the actual results. In addition, the NLP model may run against release notes provided by the user to identify new features. The video snippet may be compared against videos of the previous execution of the test case. Further, the results of the video comparison may be classified using algorithms like random forest and decision trees.

Furthermore, the system 102 determines an exact location of the bug upon analysis of the setup using the Artificial Intelligence (AI) and Machine Learning (ML) techniques. It may be noted that the exact location may be determined on the screen from the video snippet. In one embodiment, the exact location of the bug may be determined by analysing the software trace logs corresponding to the setup, as well as change in the user interface In other embodiment, the exact location of the bug may be determined by analysing the metadata timeline. The exact location may indicate the code snippet or a line of code present in the code snippet.

Subsequently, the system 102 automatically highlights the screen from the video snippet pertaining to the exact location of the bug. In one embodiment, the system 102 displays a highlight showing the bug on the video snippet in a real time. The screen may be automatically highlighted by analysing the screenshot comparison of the actual output and the expected output. The screenshot comparison may be performed using image comparison, machine learning on images as well as NLP analysis of release notes, test case steps and test case validation points. It may be noted that the screenshot comparison is performed using the AI techniques. In one example, the highlighting may be depicted using a colour or a shape on the screen. In another embodiment, the system 102 may display a textual comment on the screen highlighted in the video snippet in the real time. In one aspect, the textual comment describes a cause of the bug. The system 102 may determine the cause upon performing the AI and ML techniques on analysis of at least one of the software trace logs associated to the functionality of the bug, the automation logs, the browser HAR file, the latency variance, the comparison of historical logs with current logs, the screenshot comparison, and the release notes for new features of the software. It may be noted that the textual comment may be generated using a Natural Language Generator (NLG) technique on the analysis of the cause. In one example, the textual comment may be overlapped on the screen.

After highlighting the screen, the system 102 may create a defect corresponding to the bug. In one embodiment, the defect may comprise a merged video associated to the bug. The merged video may be created using a plurality of the video snippets corresponding to the setup and the defect. The plurality of the video snippets may indicate a trimmed video of the execution of the software under test. The defect may comprise a recommendation to resolve the bug present in the highlighted screen of the video snippet. The recommendation may be provided based on the analysis of at least one of the functionality, the new features, the software trace logs, an execution history of the software, and a type of bug detected. In one implementation, the user may provide a feedback to the recommendation provided by the system 102. In another implementation, the system 102 may provide the recommendation based on the feedback provided by the user in the past.

In one implementation, the defect may be attached to the software trace logs for resolving the bug from the software. In an example, the defect may be attached to the line of code corresponding to the bug.

Figure 2:
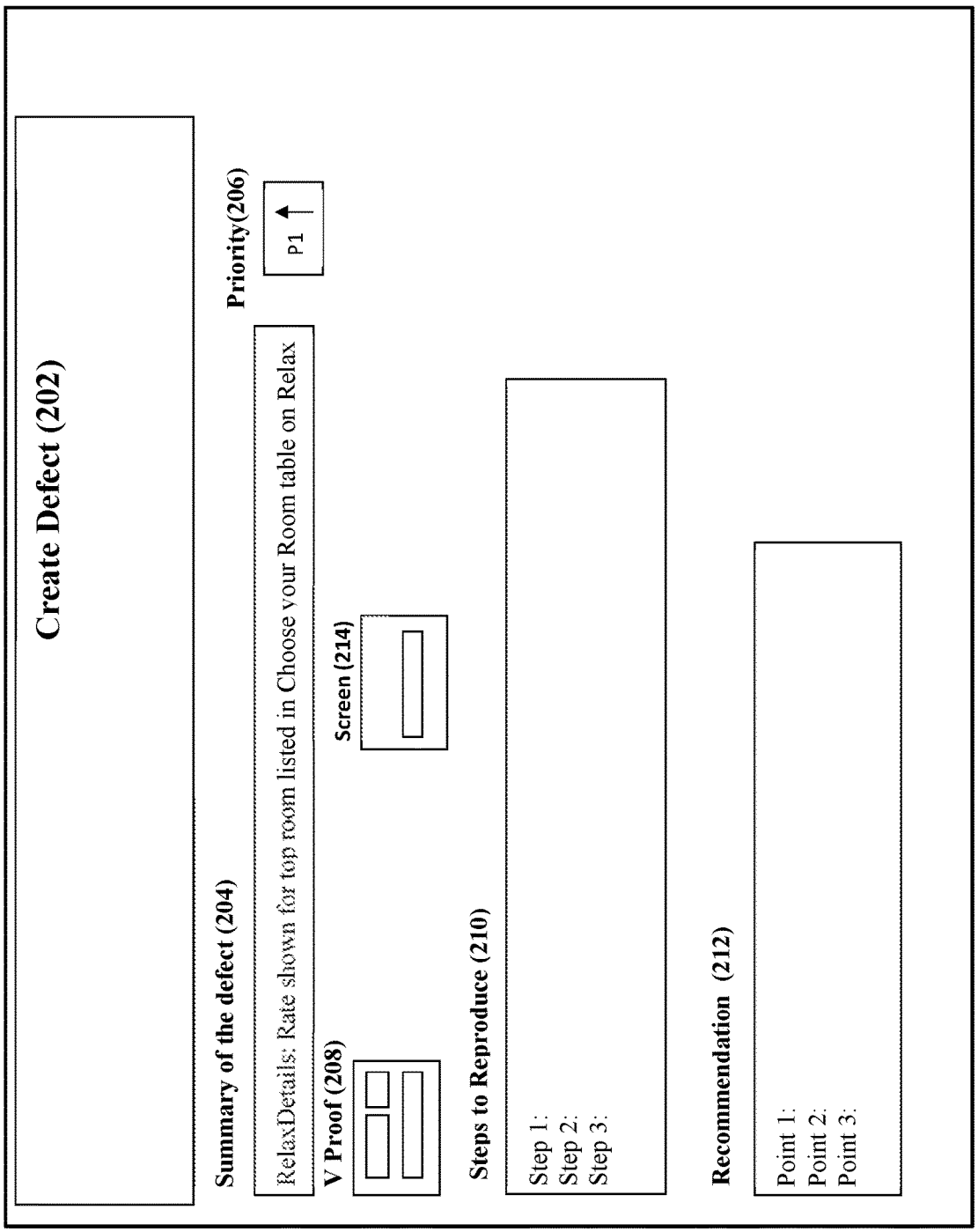
FIG. 2 illustrates a snapshot of the system for creating a defect identified during a test case run, in accordance with an embodiment of the present subject matter.

Referring now to FIG. 2, a snapshot 200 of the system 102 for creating a defect identified during a test case run is illustrated. The snapshot 200 indicates a user interface of the system 102 before creating the defect.

In order to illustrate further, consider an example of a software under test. The software comprises one or more functionalities. It may be noted that each functionality of the one or more functionalities are associated to a code snippet of the software. Assuming the software has 5 functionalities namely A, B, C, D and E. Now, during execution of the test case, the system 102 detects a bug in the functionality C. Upon detection of the bug, the system 102 identifies the code snippet corresponding to the functionality C in real time upon analysis of the software trace logs. At the same time, the system 102 identifies the setup corresponding to the bug using the AI techniques. The setup indicates actions performed by the software on a video recorded during the execution of the functionality C. The system 102 generates a video snippet corresponding to the functionality C. Further, the system 102 determines an exact location of the bug on the screen of the video snippet. It may be noted that the screen is used to accurately analyse the bug by the reviewer. Furthermore, the system 102 creates the defect corresponding to the bug detected in real time. The defect comprises a summary of the defect 204, a priority 206, a V Proof 208, steps to reproduce 210, a recommendation 212, and a screen 214.

The summary of the defect 204 indicates a textual summary about the execution of the software comprising the functionalities namely A, B, C, D and E. The priority 206 indicates a priority assigned to each defect created by the system 102. The V Proof 208 indicates the video snippet corresponding to the bug identified in the functionality C. The screen 214 comprises the highlighted screen indicating the exact location of the bug. It may be noted that the V Proof 208 and the screen 214 may help the reviewer in saving time while resolving issues with the software. Further, the steps to reproduce 210 comprises one or more steps to guide the reviewer in identifying and resolving the bug in no time. The recommendation 212 comprises a pointwise recommendation to the reviewer for resolving the defect. In one implementation, the recommendation may include a feedback provided by the reviewer before creating the defect.

Figure 3:
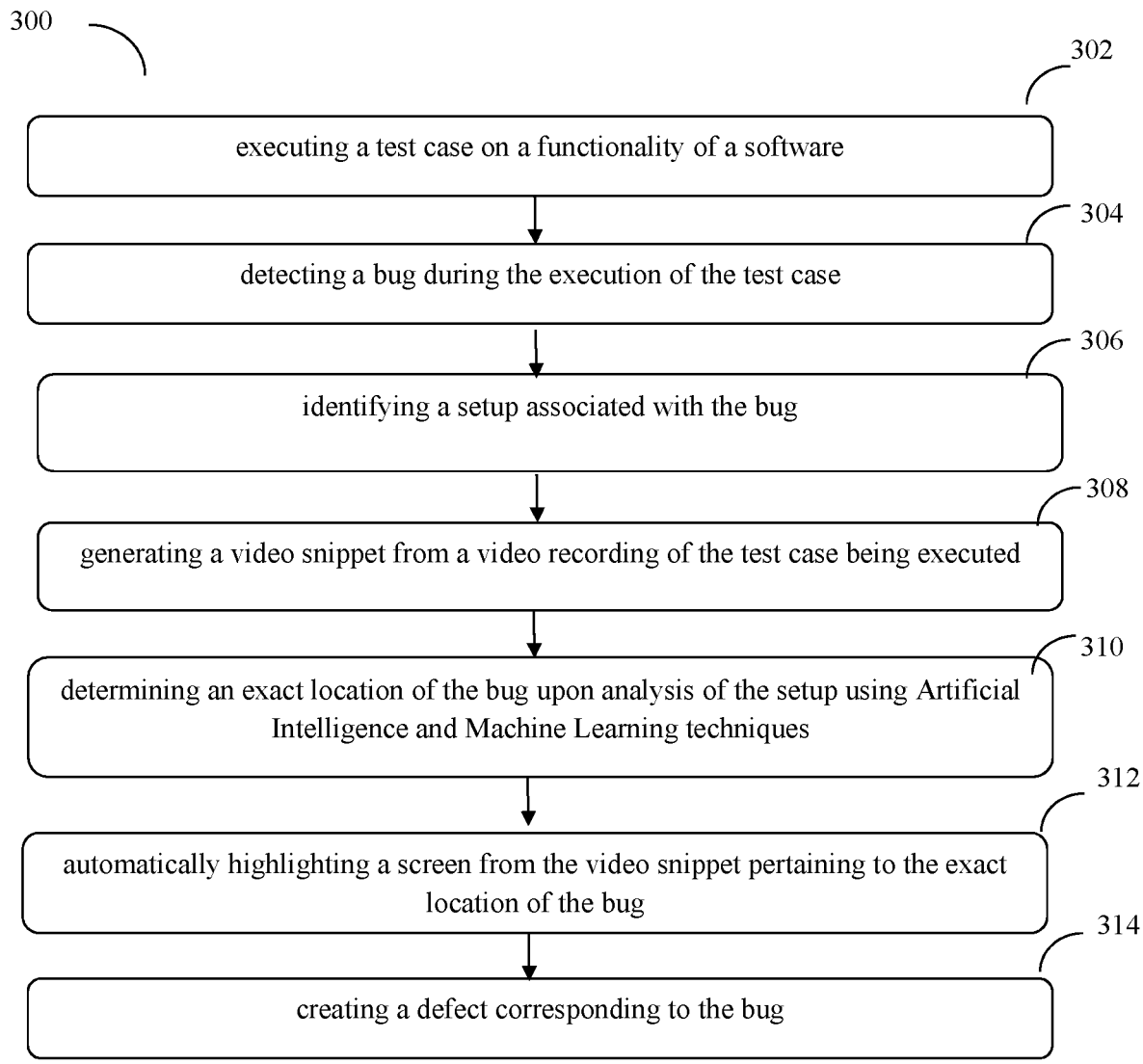
FIG. 3 illustrates a method for creating a defect corresponding to the bug, in accordance with an embodiment of the present subject matter.

Referring now to FIG. 3, a method 300 for creating a defect identified during a test case run is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods for creating a defect identified during a test case run. Additionally, individual blocks may be deleted from the method 300 without departing from the spirit and scope of the subject matter described herein. Furthermore, the method 300 for creating a defect identified during a test case run can be implemented in any suitable hardware, software, firmware, or combination thereof. However, for ease of explanation, in the embodiments described below, the method 300 may be considered to be implemented in the above described system 102.

At block 302, a test case may be executed on a functionality of a software.

At block 304, a bug may be detected during the execution of the test case. In one aspect, the bug is detected by comparing an actual output of the functionality with an expected output of the functionality. In one implementation, the bug may be stored in the memory 112.

At block 306, a setup associated with the bug may be identified. In one aspect, the setup may indicate actions performed on the software. In one implementation, the setup may be stored in the memory 112.

At block 308, a video snippet may be generated from a video recording of the test case being executed. In one aspect, the video snippet may depict an execution of the bug caused due to the setup. In one implementation, the video snippet may be stored in the memory 112.

At block 310, an exact location of the bug may be determined upon analysis of the setup using Artificial Intelligence and Machine Learning techniques. In one implementation, the exact location may be stored in the memory 112.

At block 312, a screen from the video snippet pertaining to the exact location of the bug may be automatically highlighted. In one implementation, the screen may be stored in the memory 112.

At block 314, a defect corresponding to the bug may be created. In one aspect, the defect may comprise a recommendation to resolve the bug present in the highlighted screen of the video snippet. In one implementation, the defect may be stored in the memory 112.

Exemplary embodiments discussed above may provide certain advantages. Though not required to practice aspects of the disclosure, these advantages may include those provided by the following features.

Some embodiments of the system and the method enable creation of the defect in real time without any human intervention.

Some embodiments of the system and the method reduces time of the reviewer in resolving the defect present in the software.

Some embodiments of the system and the method enable the reviewer to override the recommendation provided by the system.

Some embodiments of the system and the method enable recording of video snippets corresponding to the bug in real time for resolving the bug.

Some embodiments of the system and the method enable merging of one or more video snippets corresponding to the similar functionality and the defect.

Some embodiments of the system and the method enable a reviewer to resolve the defect by following the highlighted screen and the recommendation.

Although implementations for methods and system for creating a defect identified during a test case run have been described in language specific to structural features and/or methods, it is to be understood that the appended claims are not necessarily limited to the specific features or methods described. Rather, the specific features and methods are disclosed as examples of implementations for creating a defect identified during a test case run.

The invention claimed is:

1. A method for creating a defect identified during a test case run, the method comprising:
   executing, by a processor, a test case on a functionality of a software;
   detecting, by the processor, a bug during the execution of the test case, wherein the bug is detected by comparing an actual output of the functionality with an expected output of the functionality;
   identifying, by the processor, a setup associated with the bug, wherein the setup indicates actions performed on the software;
   generating, by the processor, a video snippet from a video recording of the test case being executed, wherein the video snippet depicts an execution of the bug caused due to the setup;
   determining, by the processor, an exact location of the bug from the video snippet upon analysis of the setup using Artificial Intelligence and Machine Learning techniques;
   automatically highlighting, by the processor, a screen from the video snippet pertaining to the exact location of the bug; and
   creating, by the processor, a defect corresponding to the bug, wherein the defect comprises a recommendation to resolve the bug present in the highlighted screen of the video snippet, wherein the setup is identified upon analysis of software trace logs associated to the functionality, automation logs, a browser HAR file, a latency variance, a comparison of historical logs with current logs, a screenshot comparison, and release notes for new features of the software.

2. The method of claim 1, further comprises attaching the software trace logs to the defect for resolving the bug from the software.

3. The method of claim 1, wherein the defect comprises a merged video associated to the bug, wherein the merged video is created using a plurality of the video snippets corresponding to the setup and the defect.

4. The method of claim 1, wherein the test case comprises at least one of an automation test case, a manual test case, and a crowd source test case.

5. The method of claim 1, further comprises displaying a textual comment on the screen highlighted on the video snippet in a real time, wherein the textual comment describes a cause of the bug.

6. The method of claim 1, further comprises displaying a highlight on the video snippet in a real time, wherein the highlight shows the bug.

7. A system for creating a defect identified during a test case run, the system comprising:
   a memory; and
   a processor coupled to the memory, wherein the processor is configured to execute program instructions stored in the memory for:
   executing a test case on a functionality of a software;
   detecting a bug during the execution of the test case, wherein the bug is detected by comparing an actual output of the functionality with an expected output of the functionality;
   identifying a setup associated with the bug, wherein the setup indicates actions performed on the software;
   generating a video snippet from a video recording of the test case being executed, wherein the video snippet depicts an execution of the bug caused due to the setup;
   determining an exact location of the bug from the video snippet upon analysis of the setup using Artificial Intelligence and Machine Learning techniques;
   automatically highlighting a screen from the video snippet pertaining to the exact location of the bug; and
   creating a defect corresponding to the bug, wherein the defect comprises a recommendation to resolve the bug present in the highlighted screen of the video snippet, wherein the setup is identified upon analysis of software trace logs associated to the functionality of the bug, automation logs, a browser HAR file, a latency variance, a comparison of historical logs with current logs, a screenshot comparison, and release notes for new features of the software.

8. The system of claim 7, further comprises attaching the software trace logs to the defect for resolving the bug from the software.

9. The system of claim 7, wherein the defect comprises a merged video associated to the bug, wherein the merged video is created using a plurality of the video snippets corresponding to the setup and the defect.

10. The system of claim 7, wherein the test case comprises at least one of an automation test case, a manual test case, and a crowd source test case.

11. The system of claim 7, further comprises displaying a textual comment on the screen highlighted on the video snippet in a real time, wherein the textual comment describes a cause of the bug.

12. The system of claim 7, further comprises displaying a highlight on the video snippet in a real time, wherein the highlight shows the bug.

13. A non-transitory computer program product having embodied thereon a computer program for creating a defect identified during a test case run, the computer program product storing instructions, the instructions comprising instructions for:

executing a test case on a functionality of a software;

detecting a bug during the execution of the test case, wherein the bug is detected by comparing an actual output of the functionality with an expected output of the functionality;

identifying a setup associated with the bug, wherein the setup indicates actions performed on the software;

generating a video snippet from a video recording of the test case being executed, wherein the video snippet depicts an execution of the bug caused due to the setup;

determining an exact location of the bug from the video snippet upon analysis of the setup using Artificial Intelligence and Machine Learning techniques;

automatically highlighting a screen from the video snippet pertaining to the exact location of the bug; and creating a defect corresponding to the bug, wherein the defect comprises a recommendation to resolve the bug present in the highlighted screen of the video snippet, wherein the setup is identified upon analysis of software trace logs associated to the functionality of the bug, automation logs, a browser HAR file, a latency variance, a comparison of historical logs with current logs, a screenshot comparison, and release notes for new features of the software.

\* \* \* \* \*